Fig.1

Ivan N. Vuceta
INVENTOR.

Fig. 2

Dec. 23, 1969  I. N. VUCETA  3,485,136
AMMUNITION FEED METHOD AND SYSTEM
Filed April 16, 1968                                      7 Sheets-Sheet 3

Fig. 3

Fig. 4      Fig. 5      Ivan N. Vuceta
                               INVENTOR.

BY
                               ATTORNEY

Fig. 6

Ivan N. Vuceta
INVENTOR.

Ivan N. Vuceta
INVENTOR.

BY *Donald R. Nyhagen*

ATTORNEY

Dec. 23, 1969      I. N. VUCETA      3,485,136

AMMUNITION FEED METHOD AND SYSTEM

Filed April 16, 1968      7 Sheets-Sheet 6

Ivan N. Vuceta
INVENTOR.

BY *Donald R. Nyhagen*

ATTORNEY

Ivan N. Vuceta
INVENTOR.

BY [signature]

ATTORNEY

United States Patent Office 3,485,136
Patented Dec. 23, 1969

3,485,136
AMMUNITION FEED METHOD AND SYSTEM
Ivan N. Vuceta, Los Angeles, Calif., assignor to TRW Inc., Redondo Beach, Calif., a corporation of Ohio
Filed Apr. 16, 1968, Ser. No. 721,727
Int. Cl. F41d 9/00
U.S. Cl. 89—34          20 Claims

ABSTRACT OF THE DISCLOSURE

An ammunition feed method and system for storing and successively dispensing beltless ammunition rounds to a gun by containing the rounds in a storage bag, feeding the bag endwise in the direction of its open end through a splitting station, splitting the bag lengthwise along diametrically opposed parting lines as the bag passes through the station, and directing the split ends of the bag laterally from the station along divergent paths in such a way as to dispense the contained rounds laterally in succession from the bag to the ammunition receiving means of the gun.

CROSS-REFERENCE TO RELATED APPLICATION

Reference is made herein to copending application Ser. No. 736,509, filed June 12, 1968, and entitled, "Article Handling System for Dispensing Discrete Articles and Weapon System Embodying Same."

BACKGROUND OF THE INVENTION

Field of the invention

This invention relates generally to the ammunition handling art. More particularly, the invention relates to an ammunition feed method and system for storing and successively dispensing beltless ammunition rounds to a gun.

As will appear from the ensuing description, the ammunition feed method and system of the invention may be utilized to feed ammunition rounds to a variety of guns. A principal application of the invention, however, involves lateral feeding of generally triangular open chamber ammunition pounds in succession to an open chamber gun. For this reason, the invention will be described in connection with this particular application.

Description of the prior art

Open chamber guns are known in the art. Particularly practical guns of this type, for example, are disclosed in prior art Patent Nos. 2,865,126; 2,847,784; 2,983,223; 2,831,401; 3,041,939; and 3,046,890. Generally speaking, the open chamber guns disclosed in these patents are characterized by a breech frame having a firing strap, an open chamber carrier or cylinder rotatably mounted within the frame and containing one or more firing chambers which open laterally through the circumference of the cylinder, and means for driving the carrier or cylinder in rotation or oscillation to locate each firing chamber sequentially in an ammunition infeed position, a firing position, and an ejection position. When in infeed position, the open side of each firing chamber registers with a lateral ammunition infeed opening in the breech frame to permit lateral infeed movement of an ammunition round into the chamber through its open side. In firing position, each firing chamber is closed by the breech frame firing strap and opens forwardly to the gun bore. Finally, when in ejection position, the open side of each firing chamber registers with a lateral ejection opening in the breech frame to permit lateral ejection of an unfired round as well as the spent cartridge case of a fired round from the chamber through its open side. Another characteristic feature of open chamber guns resides in the fact that the firing chambers and ammunition rounds have complementary, generally triangular round shapes in transverse cross-section. When a round is positioned in a firing chamber, the exposed side of the round is substantially flush with the circumference of the breech cylinder. Each cased open chamber ammunition round comprises a yieldable, noncombustible cartridge case constructed of plastic or other suitable material which expands during firing to seal the breech interfaces against propellant gas leakage.

One of the major problems encountered in the design of an open chamber weapon system embodying an open chamber gun of the kind just described involves feeding of ammunition rounds to the breech cylinder firing chambers. This problem is particularly severe in the case of high-speed or high-firing rate open chamber guns of the general type disclosed in the aforementioned prior art Patent No. 3,041,939. This type of gun is provided with a number of firing chambers which are circumferentially spaced about the breech cylinder and with an equal number of barrels which are secured to the cylinder, in coaxial alignment with the firing chambers, and rotate with the cylinder. During firing operation of such a gun, the breech cylinder and barrels are driven in continuous rotation, and ammunition rounds are fired in the chambers as the latter rotates through their respective firing positions. The relatively high cylinder speed and resulting high-firing rate of the gun poses a severe problem of feeding ammunition rounds to the firing chambers.

As will appear from the following description, the present ammunition feed system is uniquely adapted for feeding open chamber ammunition rounds to a high-firing rate open chamber gun of the kind just described. It will become evident to those versed in the art, however, that the present article handling system may be utilized for feed ammunition rounds to a conventional automatic gun.

SUMMARY OF THE INVENTION

The present invention provides an ammunition feed method wherein the ammunition rounds to be dispensed are contained in a storage bag in such a way the rounds are disposed side-by-side in a row extending lengthwise of the bag. The rounds are dispensed in succession from the bag by progressively splitting the bag in the lengthwise direction, from its open end to its closed end, along a pair of diametrically opposed parting lines and directing the split ends of the bag are driven or fed lengthwise along divergent paths leading from a bag splitting station in such a way that the bag is pulled endwise through the station and split along its parting lines as it passes through the station, whereby the rounds contained in the bag are dispensed in succession from the bag at the splitting station. Splitting of the storage bag along its parting lines as the bag passes through the splitting station may be induced in at least two different ways. According to the preferred practice of the invention, for example, the wall of the bag is weakened along its parting lines, as by perforating the wall along these lines, so that outward feeding of the split bag ends from the station along their respective divergent paths is effective to rip or tear the bag along its parting lines. According to an alternative practice of the invention, splitting of the storage bag along its parting lines is accomplished by splitting the bag wall along these lines with knives or the like as the bag passes through the splitting station.

The ammunition feed system of the invention is equipped with means for progressively splitting the article storage bag and deflecting the split ends of the bag, in the manner just discussed. The disclosed embodiments of the invention, for example, include bag feeding and splitting means which are effective to feed the split ends of the article storage bag lengthwise from the bag splitting station along divergent paths so as to pull the bag endwise through the station and split the bag lengthwise along its diametrically opposed parting lines. The rounds contained in the bag are thereby dispensed or ejected in succession from the bag along a path of movement passing between the divergent outfeed paths of the split bag ends. The storage bag is slidably contained within a guide or feed chute which guides the bag in its endwise movement to the splitting station. In the disclosed ammunition feeding application, this feed chute embodies an outfeed section leading from the splitting station for guiding the dispensed rounds from the station to an ammunition infeed means of a gun. Conceivably, the feed chute of the article handling system may be longitudinally dimensioned to contain the entire initial length of the article storage bag. To permit the containment of a relatively large number of rounds in the bag, however, the feed chute is made relatively short, and the infeed end of the chute, that is the end of the chute remote from its outfeed end, is releasably secured to and opens to the interior of a storage box. This box dimensioned to initially contain the major length of the storage bag and to accommodate placement of the bag in such a way as to minimize the bag feeding forces required to transport the storage bag and its contents to the splitting station.

The present disclosure provides two different bag feeding means for feeding or driving the split ends of the storage bag from the splitting station and thereby feeding the bag endwise to the station. In the preferred embodiment of the invention, for example, the bag feeding means comprise powered friction rollers which are mounted at opposite sides of the feed chute and disposed in frictional driving relation with the split bag ends. In an alternative embodiment of the invention the bag feeding means comprise powered takeup reels which are mounted at opposite sides of the feed chute and secured to the split bag ends. These friction rollers and takeup reels may be selectively operated in such a way as to effect selective dispensing operation of the feed system.

DESCRIPTION OF THE PREFERRED EMBODIMENTS

According to one of its aspects, the invention provides an ammunition feed system which is represented in FIGS. 1 through 9 of the drawings by the feed system 10. This feed system comprises an ammunition storage bag 12 having a leading end 12a and an opposite trailing end 12b. Bag 12 is adapted to contain a number of ammunition rounds 14 to be dispensed in such a way that the contained rounds are disposed side-by-side in a row extending lengthwise of the bag, as shown. Depending upon the number of rounds to be contained in the storage bag, the latter may be relatively short or relatively long. In a typical feed system according to the invention, however, the bag will be quite long and may be on the order of several feet in length. The storage bag may be constructed of any material having a tensile strength and other characteristics compatible with its use in the present feed system. Preferably, however, the bag is constructed of a suitable plastic material, such as a polyurethane or a polyethylene plastic. According to the present invention, the storage bag 12 is sized and shaped to receive its contained rounds 14 with a relatively close fit in their normal positions within the bag. The illustrated rounds 14, for example, have a generally rectangular shape when viewed lengthwise of the bag and are arranged in the bag with their longitudinal axes parallel to one another and extending transverse to the length of the bag. Accordingly, the bag has a generally rectangular cross-section in planes transverse to the longitudinal axis of the bag which is substantially uniform along the entire length of the bag. This interior cross-section of the bag is dimensioned to snugly receive the rounds in the manner illustrated. However, the bag may be circular or other shape in cross-section provided the bag is sufficiently flexible to assume the shape of the contained rounds.

In addition to the storage bag 12, the present ammunition feed system 10 has a bag splitting mechanism 16 for progressively splitting the bag in its lengthwise direction, from its leading end 12a to its trailing end 12b, along a pair of longitudinally extending diametrically opposed parting lines 18 and deflecting the split ends 12c of the bag laterally away from one another in such a way as to effect dispensing the articles 14 in succession from the bag. In this instance, the parting lines 18 coincide with the longitudinal center lines of the two opposing, narrow side walls of the bag. In the particular system 10 illustrated, the bag splitting mechanism 16 comprises bag feeding and splitting means for feeding the storage bag 12 endwise in the direction of its leading end 12a through a bag splitting and ammunition dispensing station 22 in such a way that the rounds 14 contained in the bag are conveyed along a prescribed infeed path 24 passing through the station, splitting the bag lengthwise along its parting lines 18 as the bag passes through the station, and directing the split bag ends 12c from the station along divergent exit paths 26 leading laterally from and toward opposite sides of the infeed path 24. This action is effective to successively dispense the rounds from the bag at the splitting station so that the rounds emerge from the station along the infeed path.

As will appear from the ensuing description, endwise feeding of the storage bag 12 through and lengthwise splitting of the bag at the splitting station 22 may be accomplished in various ways. The particular bag feeding and splitting means 20 illustrated comprise rotary bag feeding members 28. These members are rotatably mounted on a frame 30 at the splitting station 22, at opposite sides of the infeed path 24, and are disposed in driving relation with the split bag ends 12c, respectively. Rotary bag feeding members 28 are driven in rotation by driving means 32 in directions to drive or feed the split bag ends lengthwise along their respective divergent paths. Such lengthwise feeding of the split ends is effective to pull the storage bag 12 endwise through the splitting station 22. As the bag passes through the station it is split lengthwise along its parting lines 18 to effect dispensing of the rounds 14 in succession from the bag along their infeed path 24.

As noted earlier, and as will appear from broader description, splitting of the bag along its parting lines 18 as the bag passes through the splitting station 22 may be induced in various ways. In the particular feed system 110 under discussion, the bag is thus split under the action of the opposing forces created in the narrow bag sidewalls at the splitting station 22 as a consequence of lateral feeding of the split bag ends 12c from the station along their respective divergent paths 26. To this end, the narrow bag sidewalls are weakened along the parting lines 18, as by perforating the walls along these lines in the manner illustrated, whereby the parting line constitutes tear lines. Lengthwise feeding of the split bag ends 12c from the splitting station 22 along their respective divergent paths 26 thus feeds the article storage bag 12 through the station and simultaneously splits the bag along its weakened parting or tear lines 18 with a ripping or tearing action.

Referring now in more detail to the drawings, the illustrated ammunition feed system 10 under discussion comprises an infeed guide or feed chute 34 which slidably receives the storage bag 12 and guides the latter along the infeed path 24 through the bag splitting station 22. To this end, the feed chute 34 is internally dimensioned to receive the storage bag 12, when filled with the rounds 14, with a relatively close sliding fit. In this instance, then, the feed chute 34 has a generally rectangular interior cross-section which is substantially complemented by the rectangular cross-section of the filled storage bag 12 and is substantially uniform along the entire length of the chute. Feed chute 34 has an infeed end 36 and an opposite outfeed end 38. The storage bag 12 is contained in the chute with the leading end 12a of the bag nearest the chute outfeed end. The bag splitting station 22 is located adjacent the outfeed end 38 of the feed chute 34 and, in this instance, is spaced a short distance from the outfeed end to provide between the latter end and the station a relatively short feed chute outfeed section 34a. Extending through the two opposing sidewalls of the feed chute 34 are transverse exit openings 40. These exit openings are located at the bag splitting station 22. The split ends 12c of the bag extend along their respective divergent paths 26, from the interior to the exterior of the feed chute 34, through the exit openings 40, as shown. Rotatably mounted on the feed chute 34, along the leading edges of the exit openings relative to the direction of movement of the storage bag 12 through the chute, are guide rollers 42 around which the emerging split ends 12c of the bag pass, in the manner illustrated.

As noted earlier, the storage bag feeding and splitting means 20 of the illustrated article handling system 10 comprises rotary bag feeding members 28 mounted on a frame 30 at the bag feeding station 22. In this instance, the bag feeding members comprise friction drive rollers. Located opposite each friction roller is a pressure roller 48. These rollers are located adjacent, and at the two sides of the feed chute 34 containing the feed chute exit openings 40 through which extend the split ends 12c of the storage bag 12. The axes of the rollers parallel to the latter chute sides and extend parallel to one another and normal to the longitudinal axis of the chute. The roller supporting frame 30 is rigidly secured to the feed chute and includes space parallel sidewalls 50 which straddle the friction rollers in the endwise direction. The friction driving rollers 28 are rotatably supported at their ends in bearings carried by the frame sidewalls 50 and are disposed tangentially to the divergent exit paths 26, respectively, along which the split bag ends 12c are fed from the feed chute 34. The friction pressure rollers 48 are located directly opposite their respective friction driving rollers 28 in such a way that the exit paths 26 pass between the driving and pressure rollers, as shown. Each pressure roller is rotatably supported at its ends on a generally bell-crank-shaped roller carrier 52. Each roller carrier, in turn, is pivotally supported at its ends on the roller frame sidewalls 50 by pivot means 54. It will be observed that the roller carriers 52 are adapted to be rocked on their pivots 54 in such a way as to rotate the pressure rollers 48 toward and away from their respective friction driving rollers 28. Connected to the roller carriers 52 are spring 56 which yieldably urge the carriers in directions to retract the pressure rollers 48 away from their respective friction driving rollers 28. Mounted on the frame 30 adjacent the roller carriers 52, respectively, are electrical solenoids 58. The plungers 60 of the solenoids are pivotally connected to the adjacent carriers in the manner illustrated, whereby energizing of the solenoid is effective to rotate the pressure rollers toward and into frictional driving relation with their respective friction rollers.

It is evident at this point that when the feed system 10 is conditioned for operation, the storage bag 12, with its contained rounds 14, extends through the feed chute 34 to the position illustrated, wherein the leading open end 12a of the bag is located at the bag splitting station 22. The split ends 12c of the bag extend outwardly from the feed chute through its exit slots 40 and pass between the adjacent friction rollers 28 and pressure rollers 48. Assuming that the roller carrier actuating solenoids 58 are deenergized, the friction pressure rollers 48 are retracted away from their respective friction driving rollers 28 by the roller carrier springs 56. The split bag ends 12c are then released from frictional driving engagement with the friction driving rollers. Energizing of the solenoids 58 extends the pressure rollers 48 toward their respective friction drive rollers 28 to urge the bag ends 12c into frictional driving contact with the driving rollers. The driving rollers are driven by the driving means 32 in the directions indicated. Accordingly, when these rollers are disposed in frictional driving contact with the bag ends 12c, the latter are fed or driven lengthwise from the feed chute 34 along their respective divergent exit paths to feed or pull the storage bag 12 endwise through the bag splitting station.

The friction roller drive means 32 may assume various forms. The particular drive means illustrated will be described presently. Suffice it to say at this point that the drive means comprise an electric motor 64 which is drivably coupled to the friction drive rollers 28 in such a way as to drive these rollers in the indicated directions of rotation.

Considering the operation of the ammunition feed system 10 to this point, and assuming that the motor 64 is energized to power the friction drive rollers 28, system remains otherwise inactive so long as the pressure roller solenoids 58 are deenergized. When the solenoids are energized, the split bag ends 12c are urged into frictional driving engagement with the powered friction rollers and are thereby driven or fed lengthwise from the feed chute 34 along their divergent exit paths 26. In the particular embodiment of the invention under discussion, this feeding the split ends from the feed chute performs a twofold function. First, it produces a longitudinal force on the storage bag 12 and its contained rounds 14 which pulls the bag through the bag splitting station 22 and thereby transports the contained rounds through the station along the infeed path 24. Secondly, the feeding action causes lengthwise splitting of the bag along its parting lines 18 as the bag passes through the station. This combined action of feeding the storage bag endwise through the station and splitting the bag at the station results in ejection or dispensing of the rounds 14 in succession from the bag at the station and following outfeed movement of the rounds from the station through the outfeed section 34a of the feed chute 34.

As noted earlier, and as will become evident from the ensuing description, splitting of the storage bag 12 along its parting lines 18, as the bag passes through the splitting station 22, may be accomplished in various ways. In the particular form of the invention under discussion, lengthwise feeding of the split bag ends 12c from the feed chute 34 by their respective friction rollers 46, 48 produces opposing tension forces in the narrow sidewalls of the bag, transverse to its parting lines 18, which rip or tear the bag along these parting lines. To facilitate this splitting, ripping, or tearing action, the narrow bag walls are weakened along the parting lines, as by perforating the walls along these lines in the manner illustrated. The rounds dispensed from the storage bag push one another through the outfeed section 34a of the feed chute 34 and finally emerge through the open outfeed end 38 of the chute. Dispensing of rounds from the storage bag 12 may be terminated at any time by deenergizing the solenoids 58 to retract the friction pressure rollers 48 away from the powered friction drive rollers 28 and thereby release the split bag ends 12c from driving engagement with the drive rollers.

The number of rounds 14 contained in the storage bag 12 and hence the initial overall length of this bag may vary from one application to another. In those applications which require initial containment of a relatively small number of rounds and thus a storage bag of relatively short initial length, the feed chute 34 may be longitudinally dimensioned to contain the entire initial bag length. Other applications of the article handling system, however, may require an article storage bag having quite a substantial initial length. The illustrated and hereinafter described ammunition feed system of the invention, for example, requires an ammunition storage bag whose initial length is typically on the order of several feet. In these applications, containment of the entire initial bag length within the feed chute is undesirable for two reasons. First, a feed chute of the required length to contain the bag would be impractical. Secondly, the driving forces required to accelerate the bag through the feed chute would be excessive.

In this latter connection, it is evident that if the entire length of the storage bag is contained within the feed chute, the driving forces which must be exerted on the split bag ends 12c during dispensing operation of the rounds system must be sufficient to pull the entire length of the bag and all of the rounds contained in the bag through the feed chute. Obviously, the driving forces required to pull an ammunition filled bag having a length on the order of several feet, would be excessive and undoubtedly would exceed the tensile strength of the bag material and thus cause parting of the bag ends.

Figures 8A, 8B:
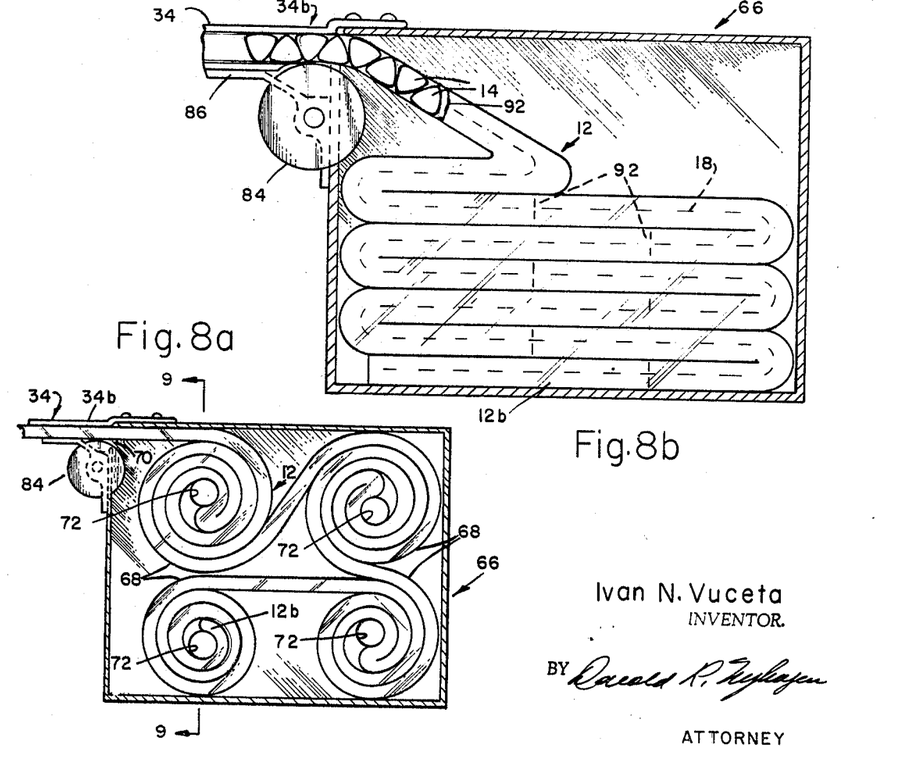
FIG. 8a is a vertical section through an ammunition storage box embodied in the feed system illustrating one manner of arranging the storage bag within the box to reduce the force required to feed the bag from the box.
FIG. 8b is a section similar to FIG. 8a illustrating an alternative manner of arranging the storage bag in the storage box.

For these reasons, the feed chute 34 of the present feed system is preferably made relatively short, as shown, and the major portion of the initial storage bag length is contained within a storage box 66. This storage box is releasably secured to the infeed end 36 of the feed chute in any convenient way. The infeed end of the chute opens to the interior of the box to permit the storage bag to extend between the box and the feed chute, as shown. The portion of the feed chute within the storage box 66 is arranged in a way which requires accelerating of only a relatively short length of the bag at any given instant during dispensing operation of the feed system. This may be accomplished in various ways. FIGS. 8a and 8b, for example, illustrate two possible methods of placing the storage bag 12 within the storage box 66 to accomplish the purpose just mentioned. In FIG. 8a, the bag is wound in a series of spiral coils 68 which are arranged in rows within the box, as illustrated. In this case, feeding of the storage bag 12 from the box occurs by unwinding of the spiral coils 68 in succession, starting with the coil nearest the outfeed or exit opening 70 of the box and proceeding from coil-to-coil of the respective coil row and then from coil-to-coil in the following row or rows. It will be observed that with this method of storing the bag within the storage box, the greatest effective length of the storage bag 12 which is moved or fed at any given instant of time is substantially equal to the length of the bag between the bag splitting station 22 and the storage box exit opening 70 plus the length of the bag from this opening to center of the currently unwinding coil 68. This bag length, obviously is but a fraction of the overall bag length. It will be immediately evident to those skilled in the art that the storage bag 12 may be coiled within the storage box 66, as shown, in various ways. The particular storage box illustrated is equipped with a number of journal openings 72 in one sidewall of the box which are located at the centers of the coils 68 in the box. Associated with the storage box is a crank 74 having a shaft 76 which is dimensioned to fit slidably within the bearing openings 72. Extending axially into the end of this shaft is a slot 78 which is dimensioned to laterally receive the storage bag 12 when filled with the rounds 14. The sidewall 80 of the storage box 66, opposite the bearing openings 72, is removable and secured in position by screws or the like.

The illustrated storage box 66 is loaded by first removing its sidewall 80 and threading the leading end 12a of the storage bag 12 through the storage box exit opening 70 from the inside of box. The slotted shaft 76 of the crank 74 is then inserted through the storage box bearing openings 72 in succession and engaged with the portion of the storage bag which is to be located at the center of the respective adjacent coils 68, after which the crank is rotated to wind the bag into a coil. This action is repeated with the crank positioned in each of the bearing openings, after which the crank is removed. Storage box 66 when finaly loaded, therefore, will contain the storage bag 12 in the multiple coil configuration illustrated.

FIG. 8b illustrates an alternative method of placing the storage bag 12 in the storage box 66. In this case, the bag is arranged in the box in such a way that the bag has a number of serpentine folds lying one on top of the other with the trailing end 12b of the bag located at the bottom of the box. The leading end 12a of the bag leads from the uppermost fold to the exterior of the box through its exit opening 70. It will be observed that when the storage box 66 is loaded in this fashion, the maximum effective length of the storage bag 12 which is fed or moved endwise at any given instant during operation of the feed system is approximately equal to the sum of the external length of the bag between the bag splitting station 22 and the storage box exit opening 70 and the internal length of the bag within the U-shaped fold of the bag nearest the exit opening.

The storage box 66 is provided with an outfeed guide 84 for guiding the storage bag 12 from the box with a smooth and unrestricted movement. This outfeed guide may assume various forms, depending upon the shape of the bag and its contained articles, the position of the outfeed path along which the bag emerges from the box, and other factors. The particular outfeed guide 84 illustrated comprises a relatively large diameter roller which is mounted on the front wall of the storage box, within its exit opening 70. The roller thus supports the storage bag 12 with a rolling action as the bag emerges through the storage box exit opening 70. Roller 84 is rotatably supported at its ends in brackets 86 secured to the box and to the feed chute 34.

Storage box 66 is releasably attached to the bag feeding and splitting mechanism 16 in such a way as to permit the box, when fully loaded, to be installed with the leading end of the storage bag 12 disposed in feeding relation with the friction drive rollers 28. When emptied, the box may be removed for replacement by a fully loaded storage box. This releasable attachment of the storage box to the bag feeding end splitting mechanism may be accomplished in various ways. In the particular ammunition feed system illustrated, the feed chute 34 is divided into two separable sections, to wit, the outfeed section 34a and an infeed section 34b. The infeed section is permanently attached to the storage box 66. The outfeed section is permanently attached to the frame 30 of the bag feeding and splitting mechanism. The guide rollers 42 for the split bag ends 12c are located just beyond the open front end of the infeed section 34b of the feed chute and are rotatably supported in brackets 88 attached to this section, as shown. When the storage box 66 is installed in the article handling system 10, the outfeed and infeed sections 34a, 34b of the feed chute 34 are longitudinally aligned and spaced to define therebetween the feed chute exit openings 40 for the split bag ends 12c. Suitable coupling means 90 are provided for releasably joining the feed chute sections in this assembled relation. In this instance, the coupling means 90 comprise coupling pins 90a which are insertable through bushings 90b secured to the frame walls 50 of the bag splitting and feeding mechanism 16 and into bores 90c drilled into blocks 90d secured to opposite sides of the feed chute infeed section 34b. Rigid on the inner sides of the frame walls 50 are guides 91 which define intervening guideways for slidably receiving the blocks 90d when the storage box 66 is installed in the handling system 10, thus to align the feed chute infeed and outfeed sections 34b, 34a.

Considering now the operation of the feed system 10 to this point, a loaded storage box 66 is selected for installation in the system, and the leading end of the storage bag 12 contained in the box is pulled from the infeed section 34b of the feed chute 34 to expose a short length of the bag. This exposed end of the bag is then split along its parting lines 18 to provide split leading ends 12c. In this regard, it should be noted that the leading end of the bag will be initially sealed to prevent loss of the contained articles 14 from the bag.

At this point, the leading end of the feed chute infeed section 34b is attached, by the coupling means 90, to the bag feeding and splitting mechanism 16 in such a way that the split leading ends 12c of the storage bag 12 are exposed externally of the assembled feed chute 34. These split ends of the bag are then threaded between the friction drive rollers 28 and the friction pressure rollers 46.

The feed system 10 is conditioned for operation by energizing the system drive motor 64. This motor then drives the friction rollers 28 in rotation in the opposite directions indicated by the arrows in the drawings. Feeding or dispensing operation of the system, of course, will not occur immediately in response to energizing the motor since the friction pressure rollers 48 are currently retracted from the friction driving rollers 28 to release the split bag ends 12c from driving engagement with the latter rollers. Actual dispensing operation of this system is accomplished by energizing the pressure roller toward the friction driving rollers and thereby urge the split bag ends into frictional driving contact with these rollers. Rotation of the driving rollers by the motor 64 is then effective to feed the split bag ends outwardly from the bag splitting station 22 along their respective divergent exit paths 26. The storage bag 12 is thereby fed endwise through the bag splitting station and simultaneously split along its perforated parting lines 18 with a ripping or tearing action as the bag passes through the station. The rounds 14 contained in the bag are now transported through the splitting station and dispensed in succession from the bag at the station. The dispensed rounds emerge from the station along their infeed path 24 and travel forwardly from the station through the feed chute outfeed section 34a to the open outfeed end 38 of this section whereupon the rounds are dispensed in succession from the chute. During this operation of the feed system, the storage bag 12 is pulled from the storage box 66, through the storage box exit opening 70, into the feed chute infeed section 34b. In this regard, it is significant to recall that the bag is preferably initially placed or loaded into the storage box 66 in the manner illustrated in FIG. 8a or FIG. 8b, or in any other way which reduces or minimizes the feeding or driving force which must be exerted on the split leading ends 12c of the bag to feed the latter from the box to the bag splitting station 22.

At this point, attention is directed to the fact that the rounds 14 contained in the storage bag 12 are transported from the storage box 66 to the bag splitting station 22 under the action of the frictional driving forces exerted on the rounds by the wall of the bag and by the effective reduction of the internal volume of the bag within each coil or loop of the bag which occurs as the respective coil or loop unwinds or unfolds during feeding of the bag from the storage box 66. In most cases, the forces thus exerted on the rounds 14 by this compound feeding action will be sufficient to transport the rounds with the storage bag 12 from the storage box 66 to the bag splitting station 22. In other cases, however, it may be desirable or necessary to implement this feeding action by providing the bag with internal transverse partitions 92 located at at intervals along the bag, as illustrated in FIG. 8b.

In some applications of the feed system, it may be desirable or necessary to dispense all of the rounds 14 contained in the system in continuous and uninterrupted fashion. This is obviously accomplished by maintaining the pressure roller solenoids 58 energized until all of the rounds have been dispensed. In other applications, however, such as the illustrated ammunition feeding application, it may be desirable to effect intermittent dispensing of the rounds. Such intermittent dispensing of the articles, of course, is accomplished by a selective energizing and deenergizing of the pressure roller solenoids 58.

It will be immediately evident to those versed in the art that various bag feeding and splitting means may be employed to feed the storage bag 12 endwise through the bag splitting station 22 and split the bag along its parting lines 18 as it passes through the station. In this connection, attention is directed to FIGS. 10 through 13 which illustrate modified bag feeding means 100 and bag splitting means 102 for this purpose. The modified bag feeding means 100 comprise a pair of takeup reels 104 which replace the friction driving and pressure rollers 28, 48 described earlier. Reels 104 are removably journalled at one end on stub shafts 105 fixed to one of the frame walls 50. The opposite ends of the reels are removably keyed on driven shafts 106 which extend slidably and rotatably through the upper and lower pinions of the gear train 232 so that the shafts may be axially retracted against the force of springs 107 to permit insertion of the reels into and removal of the reels from the feed system. To this end, the shafts 106 are provided with knurled grips 106a. The takeup reels 104 are provided with any conventional means for securing the split ends 12c of the storage bag 12 to the inner hubs of the reels, such as slots to receive these ends. Rotation of the reels in the opposite direction indicated is thus effective to feed the split ends lengthwise from the bag splitting station 22 and wind the ends on the reels. It will now be understood, therefore, that during rotation of the takeup reels 104, the storage bag is fed or pulled endwise through the bag splitting station 22 in much the same way as described earlier in connection with the first embodiment of the invention.

Figures 9, 10, 11:
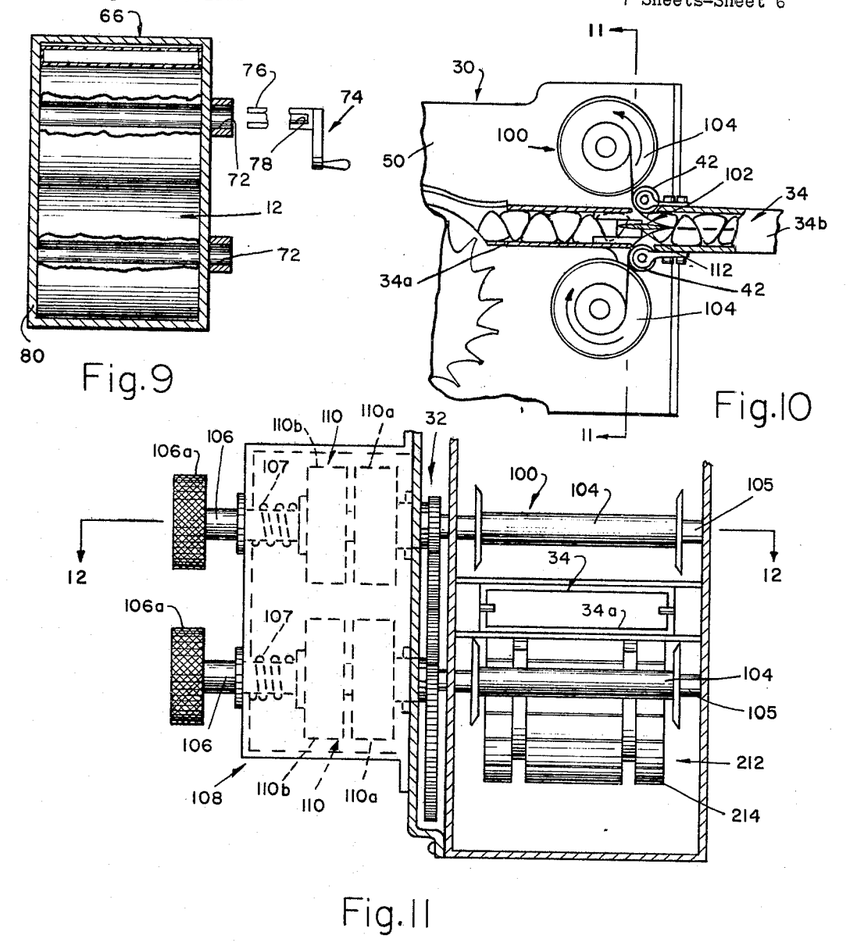
FIG. 9 is a section taken on line 9—9 in FIG. 8.
FIG. 10 is a vertical longitudinal section through the bag feeding and splitting station of a modified ammunition feed system according to the invention.
FIG. 11 is an enlarged section taken on line 11—11 in FIG. 10.
Figure 12:
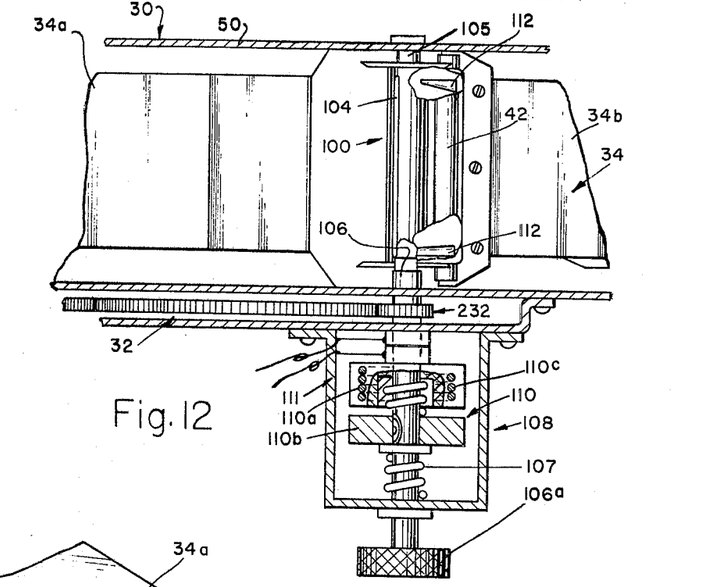
FIG. 12 is an enlarged section taken on line 12—12 in FIG. 11.
Figure 13:
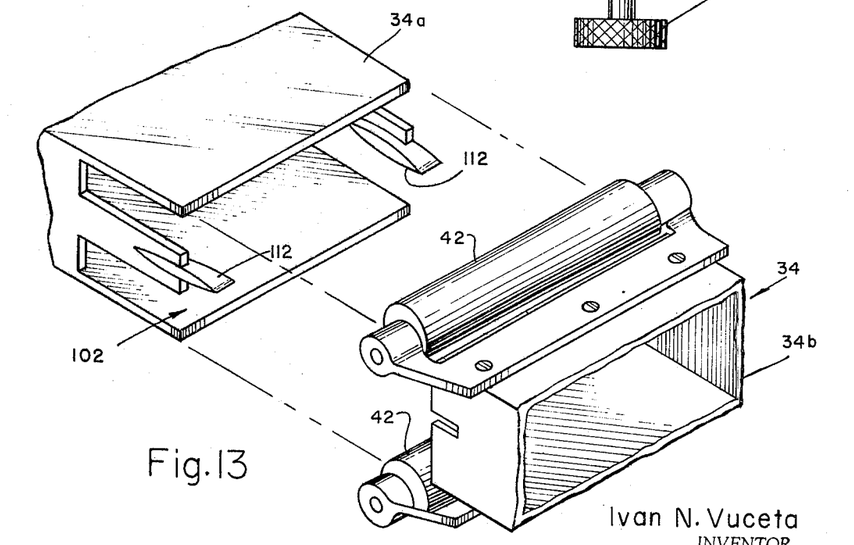
FIG. 13 is an enlarged fragmentary perspective view illustrating certain bag slitting blades embodied in the modified feed system of FIGS. 10 through 12.

The takeup reels 104 are powered or driven from the drive motor 64, of the feed system in any convenient way which will permit selective feeding of the storage bag 12 and, in addition, will compensate for the progressively increasing effective rim velocity of the reels as the effective diameters of the reels increase due to winding of the split ends on the reels. In the particular modified bag feeding means 100 illustrated, the reel driving means 108 comprise magnetic slip clutches 110 having driving members 110a and driven members 110b. Driving members 110a are rotatable on the reel shafts 106 and are fixed to the upper and lower pinions of the gear train 232, whereby the driving members are driven from the motor 64 through the driving means 32. Driven members 110b are slidably keyed on the reel shafts 106. The driving members contain coils 110c which are energized through slip ring contacts 111 to draw the driven members into driving contact with the driving members. These members engage with a slip action which is effective to impart a predetermined maximum driving torque to the takeup reels, thus to maintain a substantially constant feed rate of the storage bag 12 through the bag slitting station 22.

The modified bag splitting means 102 comprise a pair of bag slitting means 112 which are mounted on the leading end of the outfeed section 34a of the feed chute 34 in such a way as to slit the storage bag 12 along its parting lines 18 as the bag passes through the splitting station 22. In this instance, the bag slitting means 112 comprise a pair of slitting blades which are disposed in a common longitudinal medial plane of the feed chute containing the bag parting lines 18. These blades are mounted at opposite sides of and project small distances to the interior of the feed chute section 34a, in the manner best illustrated in FIG. 13, for slitting engagement with the narrow bag walls along their parting lines.

The modified ammunition infeed system illustrated in FIGS. 10 through 13 is otherwise identical to the feed system described earlier. It is now evident, therefore, that the modified system operates in essentially the same way as the earlier system except that the split ends 12c of the storage bag 12 are wound on the takeup reels 104, and the storage bag 12 is split along its parting lines 18 with a slitting action. No further description of the modified system is thus necessary.

Figure 1:
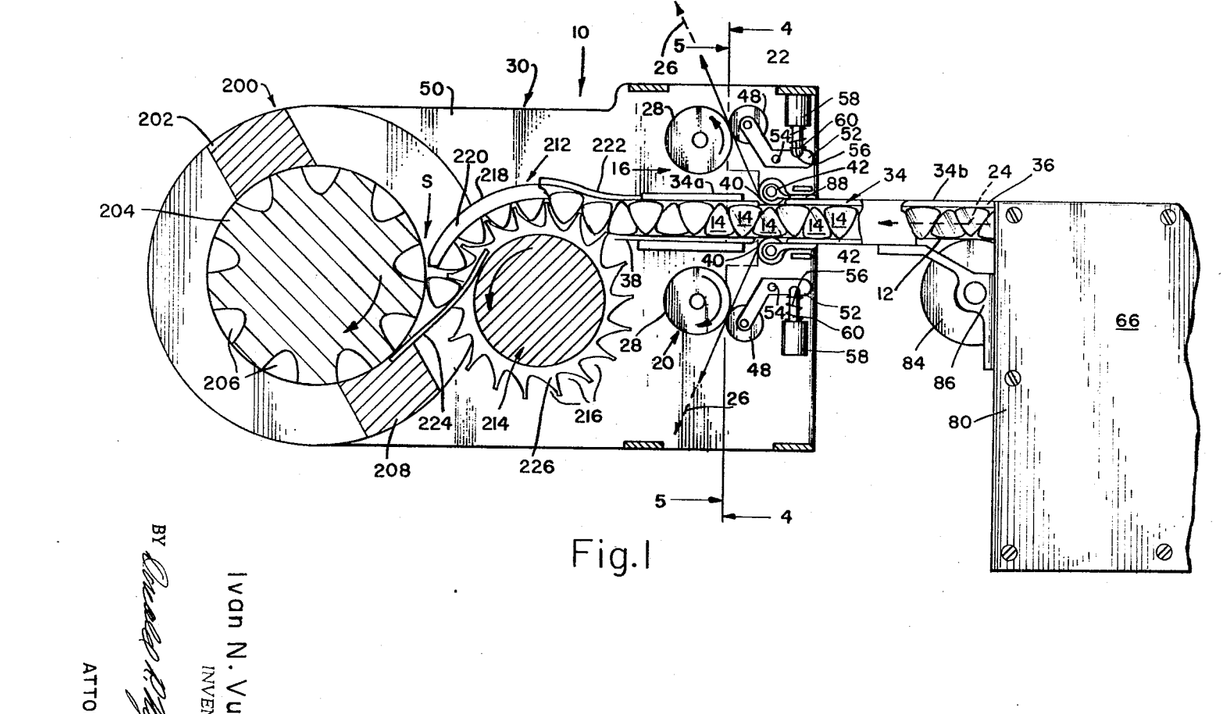
FIG. 1 is a longitudinal section through an ammunition feed system according to the invention.
Figure 2:
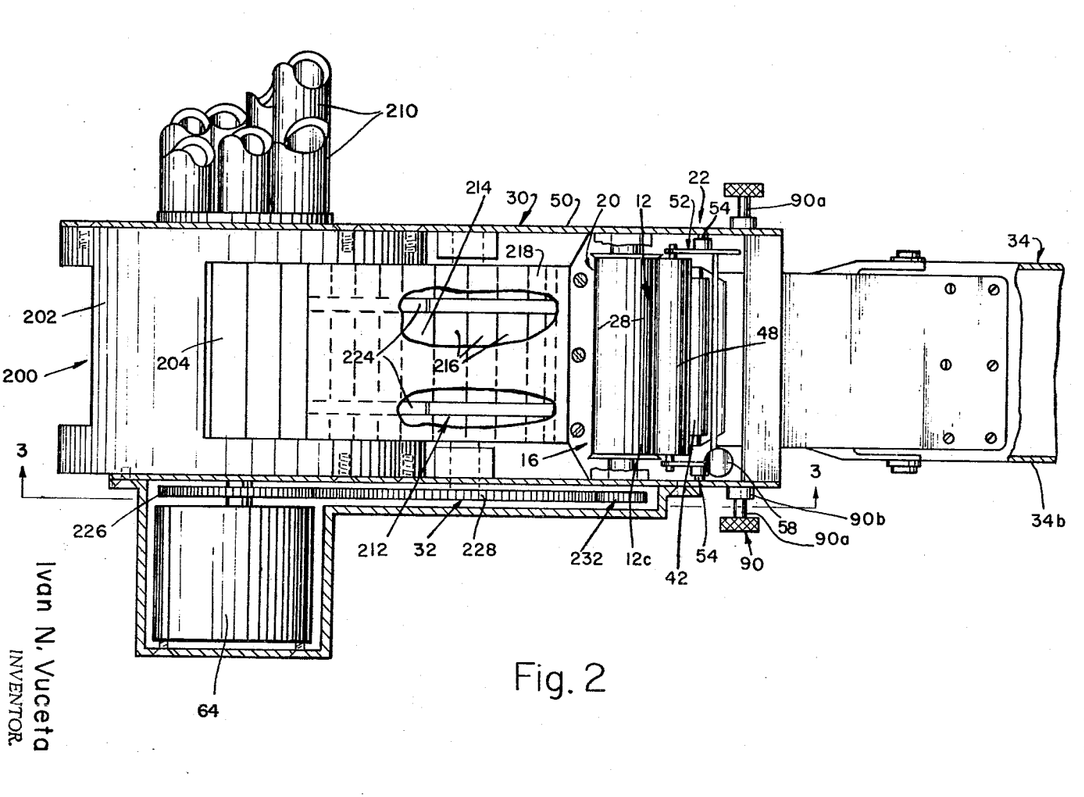
FIG. 2 is a top plan view of the feed system with parts broken away for the sake of clarity.
Figure 3:
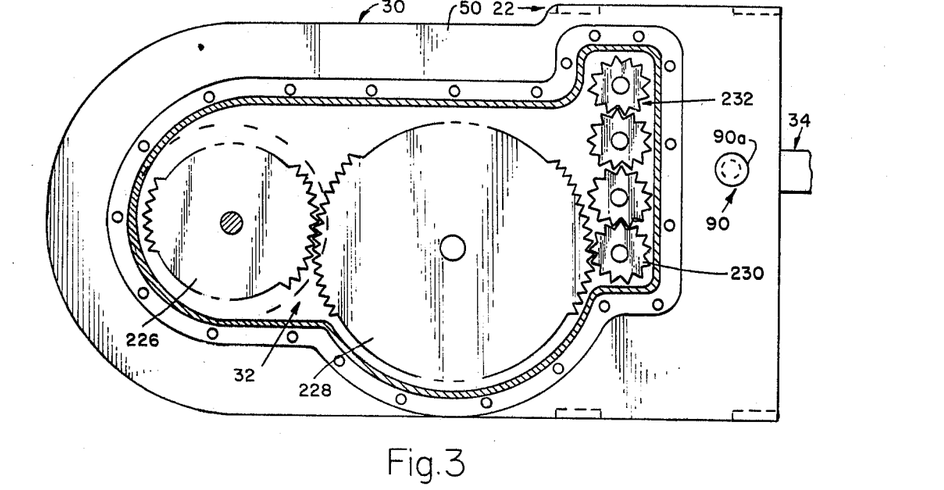
FIG. 3 is an enlarged longitudinal section taken on line 3—3 in FIG. 2.
Figure 4:
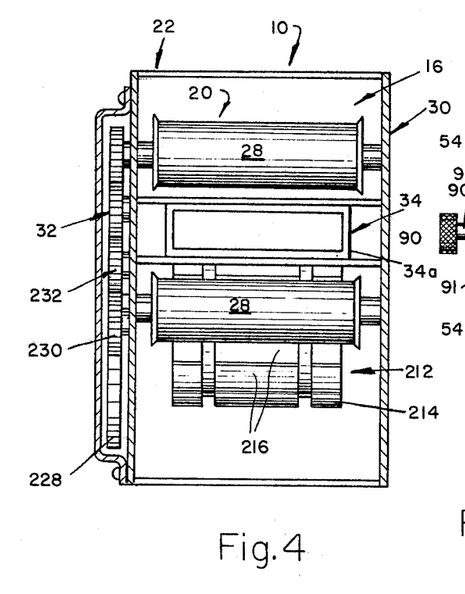
FIG. 4 is an enlarged section taken on line 4—4 in FIG. 1.
Figure 5:
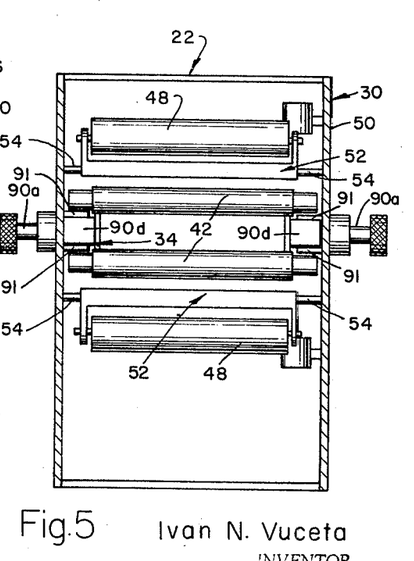
FIG. 5 is an enlarged section taken on line 5—5 in FIG. 1.
Figure 6:
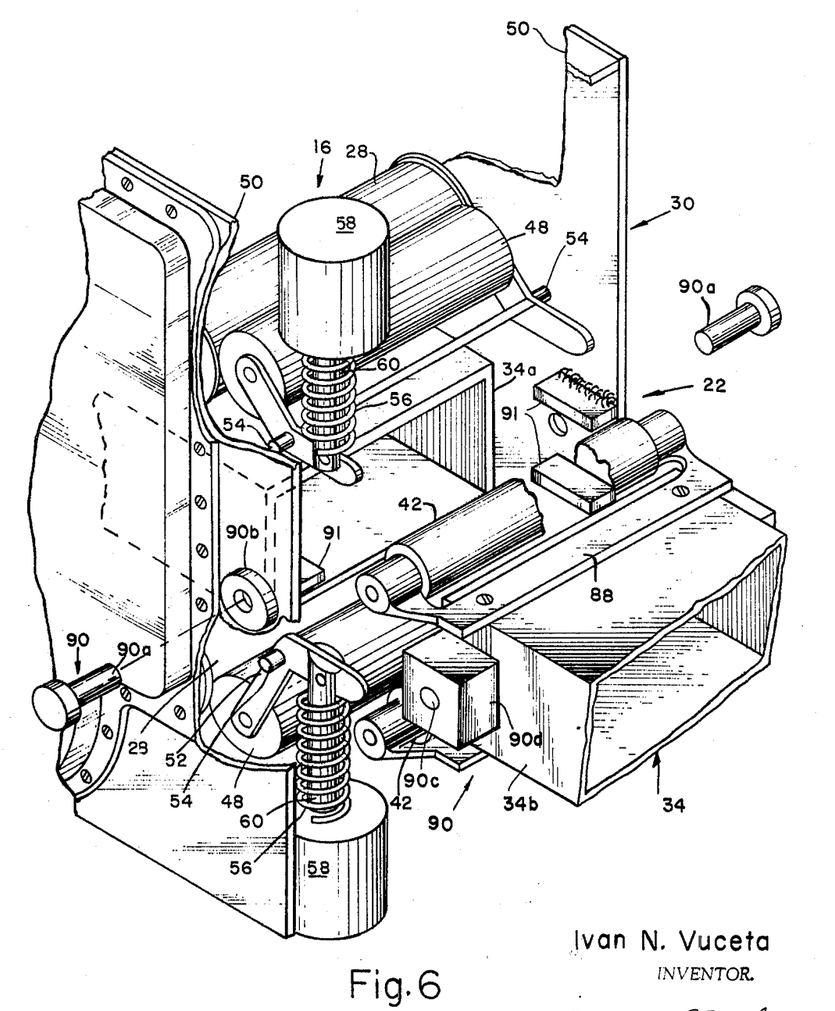
FIG. 6 is an enlarged fragmentary perspective view of the bag feeding and splitting station of the feed system.
Figure 7:
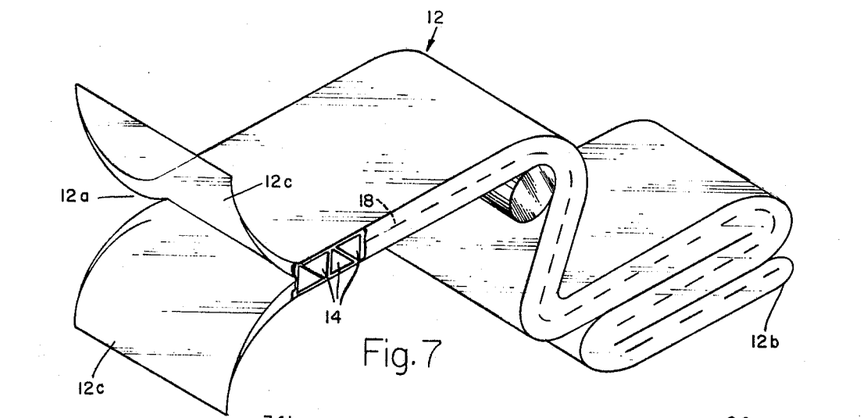
FIG. 7 is an enlarged perspective view of the ammunition storage bag used in the feed system.

The particular feed system 10 illustrated is an ammunition infeed system for feeding ammunition rounds in succession to an automatic gun 200. It will become evident as the description proceeds that the present ammunition feed system may be employed to feed ammunition rounds to many different types of guns. For example, the system may be utilized to feed ammunition cartridges to any gun which is designed to receive the cartridges laterally from the ammunition feed system. In this regard, it will be observed that the ammunition rounds 12 are placed in the ammunition storage bag 12 in such a way that the rounds extend laterally of the bag and are disposed side-by-side in a row extending lengthwise of the bag. The present invention, however, is concerned principally with feeding open chamber ammunition rounds to an open chamber gun, particularly a high speed rotary barrel open chamber gun of the general type disclosed in the aforementioned prior art Patent No. 3,041,939. For this reason, the gun 200 has been illustrated as being such a high speed open chamber gun. Since the gun 200 is generally conventional, it is unnecessary to describe the gun in complete detail. Suffice it to say that the gun comprises a breech frame 202 containing a rotary open chamber carrier or cylinder 204. This cylinder rotates on an axis which parallels the longitudinal axes of the ammunition rounds 14 within the outfeed section 34a of the feed chute 34. The breech frame has laterally presented side openings through which the circumference of the cylinder protrudes, as shown. The right hand frame opening in FIG. 1 provides an ammunition infeed opening. The left hand frame opening provides an ejection opening.

Formed in the circumference of the breech cylinder 204 are a number of uniformly spaced firing chambers 206. Each firing chamber extends longitudinally of and opens laterally through the circumference of the cylinder, as shown. The ammunition rounds 14 and firing chambers 206 have the same complementary, generally triangular round shapes in transverse cross-section as the firing chambers and ammunition rounds disclosed in the aforementioned prior art patents. The firing chambers and rounds are so sized and shaped that when a round is positioned in firing chambers, the side of the round which is exposed at the open side of the chamber is substantially flush with the circumference of the cylinder. In the particular weapon system illustrated, the motor 64, which was heretofore described as being the drive motor of the article handling system or ammunition feed system 10, is mounted on the rear end of the breech frame 202 and drives the breech cylinder 204 in rotation in the clockwise direction, as viewed in FIG. 1. During this rotation of the cylinder, each cylinder firing chamber 206 rotates in succession through an infeed position, a firing position, and an ejection position. When in infeed position, the open side of each firing chamber registers with the ammunition infeed opening of the breech frame 202 to permit lateral infeed movement of an ammunition round 14 into the chamber. In firing position, the open side of the firing chamber is closed by the breech frame firing strap 208. When in ejection position, the open side of each firing chamber registers with the ejection opening of the breech frame 202.

As noted earlier, the particular open chamber gun illustrated is a rotary barrel gun. In this type gun, the front end of the breech cylinder 204 is exposed at the front end of the breech frame 202. A number of gun barrels 210, equal in number to the firing chambers 206 are secured to and extend forwardly from the front end of the cylinder, parallel to its rotation axis. Each barrel is coaxially aligned with a firing chamber 206 and contains a bore which opens rearwardly to the front end of its respective chamber. Thus, the barrels 210 rotate with the breech cylinder 204.

Associated with the open chamber gun 200 is an ammunition infeed transfer means 212 which is operatively interposed between the gun and the ammunition infeed system 10. As will appear from the ensuing description the ammunition transfer means 212 receives the ammunition rounds 14 laterally in succession from the infeed system and transports the rounds laterally in succession to a transfer station S, wherein the rounds are ejected from the transfer means to the breech cylinder firing chambers 206. The illustrated transfer means is of the type disclosed in the aforementioned copending application Ser. No. 736,509. This transfer means comprises an ammunition transfer wheel 214 which is rotatably mounted between the frame walls 50 adjacent the ammunition infeed opening of the breech frame 202 for rotation on an axis parallel to and spaced laterally from the rotation axis of the breech cylinder 204. Formed in the circumference of the transfer wheel are a number of longitudinally extending ammunition receiving pockets 216 which open laterally through the wheel circumference. As shown in the drawings, the number of pockets exceeds the number of firing chambers 206 in the breech cylinder 204. Each pocket has a generally triangular shape in transverse cross-section and is designed to receive an ammunition round 14 in the manner illustrated. Extending about the upper circumference of the transfer wheel 214, from the outfeed end 38 of the feed chute 34 to the transfer station S of the transfer wheel, is an ammunition retaining guide 218. This guide is cylindrically curved about the rotation axis of the transfer wheel and has depending side flanges 220 disposed in planes normal to the wheel axis and passing across the ends of the wheel pockets 216. In this instance, the guide 218 is integral with and forms an extension of the feed chute 34. Adjacent the outfeed end 38 of the feed chute, the upper wall of the guide is cut away and replaced by a resiliently flexible ammunition retaining plate 222. One end of this plate is secured to the outfeed end of the feed chute. The ammunition guide 218 is radially spaced from the circumference of the transfer wheel 214 a distance to accommodate containment of the ammunition rounds 14 in the transfer wheel pockets 216 in such a way that the exposed sides of these rounds slide along the inner surface of the guide during rotation of the rounds with the wheel from the outfeed end of the feed chute to the transfer station S.

Located at the transfer station are a pair of transfer cams 224. One end of these cams is secured to the breech frame 202 in substantially tangential relation to the breech cylinder 204. The opposite ends of the cams engage within circumferential grooves 226 in the transfer wheel 214. The transfer cams 224 are located between the ends of the breech cylinder and transfer wheel and serve to effectively cam the ammunition rounds 14 laterally from the transfer wheel pockets 216 into the breech cylinder firing chambers 206 as the rounds rotate with the wheel through the transfer station.

According to the invention disclosed in the aforementioned copending application, the feed chute 34, gun 200, and ammunition transfer means 212 are constructed and arranged in such a way that the transfer wheel 214 is effective to receive the ammunition rounds 14 laterally in succession from the feed chute, and laterally transfer the rounds at the transfer position from the wheel to the breech cylinder firing chambers 206. Since the construction, arrangement, and operation of the transfer means is fully explained in the aforementioned application, it is unnecessary to explain the same in detail in this disclosure. Suffice it to say that operation of the ammunition transfer means 212 involves driving of the transfer wheel 214 in unison with but at a slightly slower speed than the breech cylinder 204 and in the direction indicated by the arrow in the drawings. To this end, the transfer wheel is drivably coupled to the drive motor 64 which, it will be recalled, also drives the friction rollers 28 (FIG. 1) and takeup reels 104 (FIG. 10).

It will be immediately evident to those versed in the art that the motor 64 may be drivably coupled in various ways to the friction rollers 28 or takeup reels 104, as the case may be, and the transfer wheel 214. In the particular weapon system illustrated, the motor 64 is mounted on the rear end of the breech frame 202 and is directly coupled to the breech cylinder 204 to drive the latter in the indicated direction. Rigid on the motor shaft is a gear 226 which meshes with a gear 228 rigid on the transfer wheel 214. The cylinder and wheel are thus driven in opposite directions of rotation by the motor. The transfer wheel gear 228 has a slightly larger pitch diameter than the cylinder gear 226. Accordingly, the transfer wheel rotates at a slightly slower speed than the breech cylinder, as just noted. The friction driving rollers 28 and the takeup reels 104 are driven in rotation from the transfer wheel gear 228. To this end, the shaft of the lower friction roller in FIG. 1, and the shaft of the lower takeup reel in FIG. 10, each mount a pinion 230 which meshes with the transfer wheel gear 228. The two friction rollers and the two takeup reels, in turn, are drivably coupled by a gear train 232.

It is now evident that when the motor 64 is energized, the breech cylinder 204 of the gun 200 and the ammunition transfer wheel 214 are driven in rotation in unison. The ammunition infeed system 10, however, remains inactive so that no ammunition rounds 14 are fed to the gun, until the friction drive roller solenoids 58 in FIG. 1 or the takeup reel clutches 110 in FIG. 10 are energized. When these solenoids or clutches are energized, the ammunition storage bag 12 of the ammunition infeed system is fed or pulled endwise through the bag splitting station 22 to effect lateral dispensing of the rounds in succession from the bag, in the manner explained earlier in connection with the article handling system per se. The dispensed ammunition rounds then travel laterally in succession through the outfeed section 34a of the feed chute 34 and enter the ammunition pockets 216 in the transfer wheel as these pockets rotate past the open outfeed end 38 of the chute. The ammunition rounds then rotate with the transfer wheel to the transfer station S where the rounds are cammed laterally in succession into the firing chambers 206 of the currently rotating breech cylinder 204. At this point, it is significant to recall that the ammunition transfer means 212, including the transfer wheel 214, constitutes the subject matter of the aforementioned copending application which described, in detail, the construction and operation of the transfer means. Accordingly, no further description of the infeed means are deemed necessary in the present disclosure. Suffice it to say that the ammunition rounds which enter the breech cylinder firing chambers 206 are thereafter rotated to firing position and fired within the gun 200. The firing chambers are then rotated through ejection position and back to infeed position to repeat the cycle. During rotation of the firing chambers through ejection position, the spent cartridge cases of the fired ammunition rounds, in the event that cased ammunition is being used, as well as any unfired rounds in the chambers, are ejected through the breech frame ejection opening. The pitch diameters of the breech cylinder gear 226 and transfer wheel gear 228 are proportioned in the manner explained in the copending application, so that the ammunition rounds 14 are transferred laterally in succession from the transfer wheel into the successive firing chambers 206 of the breech cylinder without jamming. The pitch diameters of the transfer wheel gear 228 and the friction roller or takeup reel pinion 230 are relatively proportioned to effect feeding of the split ends 12c of the ammunition storage bag 12 from the bag splitting station 22 at a speed which provides a feed rate of the ammunition rounds 14 through the station to the transfer wheel 214 slightly greater than the rate at which the transfer wheel accepts the rounds from the ammunition feed system 10. As a consequence, the ammunition feed system maintains a generally constant loading on the ammunition rounds delivered to the transfer wheel.

A unique feature of the invention resides in the fact that the storage bag may be shortened to any length by cutting and then sealing the bag. Also, two bags may be spliced to provide a longer storage bag.

What is claimed as new in support of Letters Patents is:

1. The method of feeding ammunition rounds to a gun having an ammunition infeed passage with an open infeed end, which comprises the steps of:
    selecting an ammunition storage bag having open and closed ends and a circumferentially continuous wall defining and completely surrounding an elongate circumferentially enclosed interior ammunition space of generally uniform transverse cross-section throughout its length which is sized to receive each round with its longitudinal axis disposed generally normal to the length of the bag;
    placing a number of said rounds within said bag with the rounds arranged side-by-side in a row extending lengthwise through said interior space: and
    feeding said bag endwise in the direction of its open end through a bag splitting station at the infeed end of said infeed passage, progressively splitting said bag in the lengthwise direction at said station by parting of said bag wall along a pair of longitudinally extending diametrically opposed parting lines and directing the split ends of said bag along divergent paths extending in opposite direction from said station in such a way as to dispense said rounds laterally in succession from said bag to said infeed passage.

2. The method according to claim 1, wherein:
    said method comprises the further step of weakening said bag wall along said parting lines in such a way that said parting lines comprise tear lines; and
    said feeding, splitting and directing step involves feeding the split ends of said bag lengthwise along said divergent paths in such a way as to pull said bag endwise in the direction of its open end through said station and split said bag at said station along said tear lines with a tearing action.

3. The method according to claim 1, wherein:
said feeding, splitting and directing step involves feeding said split bag ends lengthwise along said divergent paths in such a way as to pull said bag endwise in the direction of its open end through said splitting station, and slitting said bag wall along said parting lines as said bag passes through said station.

4. The method according to claim 1, wherein:
said ammunition rounds are open chamber ammunition rounds of generally triangular round shape in transverse cross-section, and said rounds are placed within said bag in a manner such that the attached rounds are inverted relative to one another to place side faces of the attached rounds in mutual contact.

5. An ammunition feed system for storing and dispensing ammunition rounds laterally in succession to a gun comprising:
an ammunition storage bag having open and closed ends and a circumferentially continuous wall defining and completely surrounding an elongate circumferentially enclosed interior ammunition space of generally uniform transverse cross-section throughout its length which is sized to receive each round with its longitudinal axis disposed generally normal to the length of the bag, said bag being adapted to contain a number of said rounds with the latter disposed side-by-side in a row extending lengthwise through said interior space; and
a bag feeding and spliting mechanism having a splitting station, and means at said station for feeding said bag endwise in the direction of its open end through said station and progressively splitting said bag in the lengthwise direction from its open end to its closed along a pair of longitudinally extending diametrically opposed parting lines by parting of said bag wall along said parting lines as said bag passes through said station and directing the split ends of said bag from said station along divergent paths in such manner as to dispense rounds contained in said bag laterally in succession from said bag at said station.

6. An ammunition feed system according to claim 5, wherein:
the wall of said bag is weakened along said parting lines, whereby said parting lines constitute tear lines; and
said bag feeding and splitting means comprise means engageable with the split ends of said bag for feeding said split ends in the lengthwise direction from said station along their respective divergent paths in such a way as to split said bag along said tear lines with a tearing action.

7. An ammunition feed system according to claim 5, wherein:
said bag feeding and splitting means comprise slitting members at said station for slitting said bag wall along said parting lines.

8. An ammunition feed system according to claim 5, wherein:
said bag feeding means comprise pairs of powered friction rollers mounted at opposite sides of said divergent paths, respectively, in straddling relation to said split bag ends, and means for selectively urging the rollers into frictional driving contact with their respective intervening split bag ends to feed said split bag ends along their respectively divergent paths and thereby pull said bag through said station.

9. An ammunition feed system according to claim 5, wherein:
said bag feeding means comprise a pair of rotary take-up reels rotatably mounted along said divergent paths, respectively, and secured to said split bag ends, and means for selectively driving said reels in rotation to feed said split ends along their respective divergent paths and thereby pull said bag through said station.

10. A gun system comprising:
a gun including ammunition infeed means for laterally receiving ammunition rounds in succession and conveying said rounds to firing position; and
an ammunition storage and feed mechanism mounted on said gun including an ammunition storage bag having a circumferentially continuous wall defining and completely surrounding an elongate circumferentially enclosed interior ammunition space of generally uniform transverse cross-section throughout its length for containing said ammunition rounds with the latter disposed side-by-side in a row extending lengthwise of said bag, said bag having open and closed ends and being adapted to be progressively split in the lengthwise direction from said open end to said closed end by parting of said bag wall along longitudinally extending diametrically opposed parting lines, and bag feeding and splitting means for feeding said bag endwise in the direction of its open end through a splitting station disposed in ammunition transfer relation to said infeed means in such manner that ammunition rounds contained in said bag are conveyed along a given feed path passing through said station, splitting said bag in said lengthwise direction along said parting lines as said bag passes through said station, and directing the split ends of said bag from said station along divergent paths leading laterally from and to opposite sides of said given path, thereby to dispense the contained ammunition rounds in succession from said bag to said infeed means.

11. A gun system according to claim 10, wherein:
said bag wall is weakened along said parting lines; and
said bag feeding and splitting means comprise rotary bag feeding means at said splitting station located at opposite sides of said given path and disposed in feeding engagement with said split bag ends, and means for driving said rotary bag feeding means in rotation in directions to feed said split ends lengthwise along their respective divergent paths in such a way as to pull said bag through said splitting station and split said bag along said parting lines with a tearing action.

12. A gun system according to claim 10, wherein:
said bag feeding and splitting means comprise rotary bag feeding means at said splitting station located at opposite sides of said given path and disposed in feeding engagement with said split ends, respectively, means for driving said rotary bag feeding means in directions to feed said split ends lengthwise along their respective divergent paths and thereby pull said bag through said splitting station, and blades mounted at said splitting station for slitting said bag wall along said parting lines thereof as said bag passes through said splitting station.

13. A gun system according to claim 10, wherein:
said gun is an open chamber gun having an open chamber breech mechanism including a breech frame having a firing strap, a breech cylinder rotatably mounted within said frame and containing a number of longitudinally extending circumferentially spaced firing chambers opening laterally through the circumference of said cylinder, and means for driving said cylinder in rotation to locate each firing chamber in an ammunition infeed position wherein the respective chamber is disposed for lateral infeed movement of an ammunition round from said infeed means into the respective chamber through its open side and a firing position wherein the open side of the respective chamber is closed by said breech frame firing strap; and said infeed means comprise a transfer wheel containing a number of longitudinally extending circumferentially spaced ammunition receiving pockets opening laterally through the circumference of said wheel, means for driving said wheel in rotation in unison with said breech cylinder to rotate said pockets in succession through an infeed position wherein each pocket is disposed to laterally receive an ammunition round from said ammunition storage and feed mechanism and a transfer position wherein the respective pocket is disposed in ammunition transfer relation to a firing chamber in said breech cylinder, and means for laterally transferring an ammunition round from each pocket when in transfer position to the firing chamber currently in infeed position.

14. A gun system according to claim 10, wherein:
said bag feeding and splitting means comprise pairs of powered friction rollers mounted at opposite sides of said splitting station and receiving therebetween said split bag ends, respectively, and power actuated means for selectively and simultaneously urging the rollers of said roller pairs into frictional driving engagement with their respective intervening split bag ends to feed said bag through said splitting station.

15. A gun system according to claim 10, wherein:
said bag feeding and splitting means comprise a pair of rotary takeup reels rotatably mounted at opposite sides of said splitting station and secured to said split bag ends, and means for driving said reels in rotation to feed said bag through said splitting station.

16. A gun system according to claim 10, wherein:
said parting lines extend along the ends of the ammunition rounds contained within said ammunition storage bag.

17. An open chamber gun system comprising:
an open chamber gun including a breech frame having a firing strap, a breech cylinder rotatably mounted in said frame and containing a number of longitudinally extending circumferentially spaced firing chambers of generally triangular round cross-section open laterally through the circumference of said cylinder, and means for driving said cylinder in rotation to locate each firing chamber in an ammunition infeed position wherein the open side of the respective chamber registers with an ammunition infeed opening in one side of said frame and a firing position wherein the open side of the respective chamber is closed by said firing strap;

an ammunition transfer wheel rotatably mounted on said frame at said one side thereof for turning on an axis parallel to the rotation axis of said breech cylinder, said transfer wheel containing a number of longitudinally extending circumferentially spaced ammunition receiving pockets of generally triangular shape in transverse cross-section and opening laterally through the circumference of said wheel, means for driving said transfer wheel in rotation with said breech cylinder to locate each pocket in an infeed transfer position wherein the respective pocket is disposed for lateral infeed movement of an ammunition round into the respective pocket and an outfeed transfer position wherein the open side of the respective pocket registers with the open side of the firing chamber currently in infeed position, and transfer means for laterally transferring an ammunition round from each pocket in outfeed transfer position to the firing chamber currently in infeed position; and an ammunition storage and feed system including an ammunition storage bag having a circumferentially continuous wall defining and completely surrounding an elongate circumferentially enclosed interior ammunition space of generally uniform transverse cross-section throughout its length for containing a number of open chamber ammunition rounds of generally triangular round cross-section with the rounds disposed side-by-side in a row extending lengthwise of said bag, said bag having open and closed ends and being adapted to be progressively split in the lengthwise direction from said open end to said closed end by parting of said bag wall along a pair of longitudinally extending diametrically opposed parting lines, a feed chute having an exit end at said infeed transfer position and an opposite infeed end and containing said bag with the open end of the bag nearest said exit end, said chute having sidewall slots in opposite sides thereof located at a bag splitting station adjacent said exit end, the open end of said bag being split a distance along said parting lines to provide said bag with split ends which pass to the exterior of said chute through said slots, respectively, rotary bag feeding members mounted on said chute externally and at said opposite sides thereof adjacent said chute slots and disposed in feeding engagement with said split bag ends, respectively, means for driving said rotary bag feeding members in rotation in directions to feed said split ends lengthwise from said chute in such a way as to pull said bag through said chute and splitting station toward said exit end, means for effecting splitting of said bag wall along said parting lines as said bag passes through said splitting station, thereby to dispense said ammunition rounds laterally in succession from said bag through said chute to said transfer wheel, and an ammunition box releasably secured to and opening to the infeed end of said chute for containing the closed end portion of said bag.

18. A gun system according to claim 17, wherein:
said bag wall is weakened along said parting lines, whereby feeding of said split bag ends from said chute is effective to split said bag along said parting lines with a tearing action.

19. An open chamber gun system according to claim 17, wherein:
said bag splitting means comprise blades for slitting said bag along said parting lines.

20. An open chamber gun system according to claim 17, wherein:
said parting lines extend along the ends of the ammunition rounds contained within said ammunition storage bag.

References Cited

UNITED STATES PATENTS

| 1,140,715 | 5/1915 | Purcell. |
| 2,598,001 | 5/1952 | Kunz. |
| 2,815,699 | 12/1957 | Davis. |
| 2,831,401 | 4/1958 | Dardick. |

FOREIGN PATENTS

| 536,873 | 5/1941 | Great Britain. |
| 542,119 | 12/1941 | Great Britain. |

BENJAMIN A. BORCHELT, Primary Examiner

S. C. BENTLEY, Assistant Examiner